United States Patent
Manabe

(10) Patent No.: US 7,221,526 B2
(45) Date of Patent: May 22, 2007

(54) LENS DRIVING DEVICE AND IMAGING DEVICE

(75) Inventor: Mitsuo Manabe, Saitama (JP)

(73) Assignee: Fijinon Corporation, Saitama (JP)

( * ) Notice: Subject to any disclaimer, the term of this patent is extended or adjusted under 35 U.S.C. 154(b) by 100 days.

(21) Appl. No.: 11/125,241

(22) Filed: May 10, 2005

(65) Prior Publication Data

US 2005/0264899 A1    Dec. 1, 2005

(30) Foreign Application Priority Data

| May 31, 2004 | (JP) | ............... P.2004-161709 |
| May 31, 2004 | (JP) | ............... P.2004-161710 |
| Jun. 8, 2004 | (JP) | ............... P2004-169889 |

(51) Int. Cl.
    *G02B 7/02* (2006.01)
(52) U.S. Cl. .................. 359/824; 359/822; 359/823
(58) Field of Classification Search ............... 359/696, 359/819, 822, 823, 824
    See application file for complete search history.

(56) References Cited

U.S. PATENT DOCUMENTS

| 4,596,449 | A | | 6/1986 | Iwata et al. |
| 4,605,286 | A | | 8/1986 | Sumi |
| 4,639,084 | A | | 1/1987 | Kugioka |
| 5,237,357 | A | | 8/1993 | Morisawa |
| 5,847,874 | A | | 12/1998 | Sasao et al. |
| 5,978,161 | A | | 11/1999 | Lemke |
| 6,424,472 | B1 | | 7/2002 | Chen |
| 2003/0178911 | A1 | | 9/2003 | Aoshima |
| 2003/0219244 | A1 | | 11/2003 | Suh |
| 2006/0061223 | A1 | * | 3/2006 | Manabe ................. 310/80 |
| 2006/0061890 | A1 | * | 3/2006 | Otaka et al. ............ 359/824 |
| 2006/0061891 | A1 | * | 3/2006 | Ito et al. ............... 359/824 |
| 2006/0062559 | A1 | * | 3/2006 | Naka et al. ............. 396/79 |

FOREIGN PATENT DOCUMENTS

| JP | 56-147132 A | 11/1981 |
| JP | 59-109006 A | 6/1984 |
| JP | 59-109007 A | 6/1984 |
| JP | 60-415 A | 1/1985 |

(Continued)

OTHER PUBLICATIONS

European Search Report dated Oct. 12, 2005 for EP 0500 0597.

(Continued)

*Primary Examiner*—David N. Spector
(74) *Attorney, Agent, or Firm*—Sughrue Mion, PLLC

(57) ABSTRACT

A lens driving device provided with a stator having a cylindrical shape, for generating a magnetic field therein; a rotor located within the stator and being rotation-driven by a magnetic field created by the stator; a lens holder located further inside the rotor, for holding a plurality of lenses with a small lens thereof being located at an arrangement end of the plurality of lenses; a converting mechanism for converting the direction of force of rotation driving of the rotor into direction along the optical axes of the lenses and transmitting the force in the direction thus converted to the lens holder; and a rotation stopper mechanism formed beside the small lens, for preventing the rotation of the lens holder.

10 Claims, 6 Drawing Sheets

FOREIGN PATENT DOCUMENTS

| | | |
|---|---|---|
| JP | 60-416 A | 1/1985 |
| JP | 60-417 A | 1/1985 |
| JP | 62-195615 A | 8/1987 |
| JP | 62-267711 A | 11/1987 |
| JP | 62-275231 A | 11/1987 |
| JP | 63-163807 A | 7/1988 |
| JP | 4-113340 A | 4/1992 |
| JP | 2002-277723 A | 9/2002 |

OTHER PUBLICATIONS

Partial European Search Report dated Jul. 19, 2005 for EP 0500 9597.

\* cited by examiner

LENS DRIVING DEVICE AND IMAGING DEVICE

This application is based on Japanese Patent application JP 2004-161709, filed May 31, 2004; JP 2004-161710, filed May 31, 2004; and JP 2004-169889 filed Jun. 8, 2004, entire contents of which are hereby incorporated by reference.

BACKGROUND OF THE INVENTION

1. Technical Field of the Invention

This invention relates to a lens driving device for driving lenses in a direction along their optical axes, and an imaging device for acquiring image data representing object light.

2. Description of the Related Art

It is now prevalent that an imaging device for acquiring a digital image of an object is incorporated in small-sized devices such as a cellular phone and PDA (Personal Digital Assistant). Since the small-sized device is equipped with the imaging device, the user can easily take a photograph at any time without labor of carrying a digital camera or video camera. These small-sized devices, which usually previously incorporate a data communication function using radio wave or infrared rays, has an advantage of being capable of instantaneously transmitting a picked up image to another cellular phone or a personal computer.

However, since the imaging device incorporated in these small-sized devices, such as the cellular phone, is much smaller than an ordinary digital camera, the size of its components such as a lens and CCD (Charge Coupled Device) and the space for housing these components are greatly limited. Thus, in order that these small-sized devices are used in place of the digital camera, they are insufficient in the imaging function and image quality of the image. Their use is limited to taking a picture or image not requiring image quality, e.g. taking the picture in place of making a note, or taking the picture for a waiting screen of the cellular phone.

In view of these circumstances, in recent years, a small-sized CCD with high a density of pixels and a small-sized lens with high contrast have been developed. Correspondingly, realization of high quality of the picture taken using the small-sized device such as the cellular phone or the PDA has advanced rapidly. As regards the fulfillment of an imaging function which is an unsolved problem, these small-sized devices are desired to incorporate an auto-focusing function and a zooming function which are usually incorporated in the digital camera.

The auto-focusing function and the zooming function can be realized by moving a plurality of lenses in a direction along their optical axis (hereinafter referred to as a back-and-forth direction) within the imaging device. In the digital camera or digital video camera, previously known lens driving techniques use rotation by a DC motor or stepping motor, and use contraction/extension of a piezoelectric element. Where these techniques are applied to the small-sized devices such as the cellular phone, from the viewpoint of downsizing the device and accuracy of movement control of the lenses, a technique of using a hollow stepping motor is preferred in which a hollow cylindrical rotor encircling the outer periphery of a lens mirror cylinder with lenses held is rotated by applying a pulse current to a stator encircling the outer periphery of the hollow rotor. As this lens driving technique using the hollow stepping motor, proposed is driving the lens mirror cylinder along the optical axis through a moving mechanism such as a cam mechanism located between the lens mirror cylinder and the rotor (see e.g. JP-A-56-147132, JP-A-59-109006 and JP-A-59-109007); moving the lens mirror cylinder by the rotor itself (see e.g. JP-A-60-415, JP-A-60-416 and JP-A-60-417); and integrating the lens mirror cylinder and the rotor (see e.g. JP-A-62-195615). Among these techniques, according to the techniques described in JP-A-60-415, JP-A-60-416 and JP-A-60-417, and JP-A-62-195615, provision of any specific moving mechanism is not required, thereby downsizing the entire device. However since the lens mirror cylinder is moved in the back-and-forth direction while being rotated, the image may shift due to eccentricity of the lenses. On the other hand, according to the techniques described in JP-A-56-147132, JP-A-59-109006 and JP-A-59-109007, since the rotating force of the rotor is converted into force in the back-end-force direction by the moving mechanism arranged between the rotor and lens mirror cylinder, by providing a rotation stopper for limiting the movement of the lenses in the rotating direction, the lenses can be moved in the back-and-forth direction without being rotated, thereby avoiding inconvenience due to the eccentricity of the lenses.

Further, the imaging device using the hollow stepping motor is constructed of a plurality of components such as a stator and a rotor which are housed within a strong enclosure capable of enduring external stress. By using such an enclosure, even when external stress is applied, inconveniences that the components hit each other and the rotation of the rotor rattles can be avoided, thereby permitting the lenses to be accurately driven.

However, the techniques described in the above Patent References have been accomplished so that they are applied to a digital camera having an ordinary size, or the like. Thus, if these techniques are applied, as they are, to the small-sized device much smaller than the digital camera, there occur inconveniences that the lenses are not driven or a sufficient space for housing the components cannot be assured. For example, in the techniques described in JP-A-56-14713.2, JP-A-59-109006 and JP-A-59-109007, it is difficult to assure the space for providing the rotation stopper.

SUMMARY OF THE INVENTION

An object of this invention is to provide a small-sized lens driving device and imaging device capable of driving lenses along their optical axis.

In accordance with a first embodiment of the lens driving device of this invention, a lens driving device is characterized by comprising: a stator having a cylindrical shape, for generating a magnetic field therein; a rotor located within the stator and having another cylindrical shape which is coaxial with the stator, the rotor being rotation-driven by a magnetic field created by the stator; a lens holder located further inside the rotor, for holding a plurality of lenses to be arranged with their optical axes along a center axis of the rotor, a small lens of the plurality of lenses having a relatively smaller diameter than that of other lenses being located at an arrangement end of the arrangement of the plurality of lenses; a converting mechanism for converting the direction of force of rotation driving of the rotor into the direction along the optical axes of the lenses and transmitting the force in the direction thus converted to the lens holder; and a rotation stopper mechanism formed beside the small lens, for preventing the rotation of the lens holder.

In accordance with the lens driving device of this embodiment, since the plurality of lenses arranged with the small lens located at an arrangement end is held by the lens holder, beside the small lens, a space is created corresponding to a difference between the diameter of the small lens and that of other lenses. For this reason, even where the lens driving device is incorporated in a small-sized device such as the cellular phone, the rotation stopper mechanism can be provided within the space so that the plurality of lenses can be driven accurately with suppressed position displacement of the plurality of lenses.

Preferably, in the lens driving device according to this embodiment, the converting mechanism is composed of spiral grooves formed on the inner wall of the rotor and other spiral grooves formed on the outer wall of the lens holder and engaged with the spiral grooves of the rotor.

According to the lens driving device in this preferred embodiment, as compared with the case of using a cam mechanism as the converting mechanism, the distance between the rotor and the lens holder can be decreased, thereby downsizing the device.

Further, preferably, the rotation stopper mechanism is composed of a guide and a rail which extend in parallel to the optical axes of the lenses, the guide and rail formed to fit to each other, one of the guide and rail being secured to the lens holder whereas the other thereof being secured to the stator.

Now, the expression "secured to the lens holder (stator)" includes both cases where the guide and rail are directly secured to the lens holder and stator and where they are indirectly secured to the lens holder and stator.

By the guide and rail which are secured to the lens holder and the stator, the lens holder can be guided in the direction along the optical axes so that the rotation of the lens holder for the stator can be surely stopped.

An imaging device according to the first embodiment of this invention is characterized by comprising: a stator having a cylindrical shape, for generating a magnetic field therein; a rotor located within the stator and having another cylindrical shape which is coaxial with the rotor, the rotor being rotation-driven by a magnetic field created by the stator; a lens holder located further inside the rotor, for holding a plurality of lenses to be arranged with their optical axes along a center axis of the rotor, a small lens of the plurality of lenses having a relatively smaller diameter than those of other lenses being located at an arrangement end of the arrangement of the plurality of lenses; a converting mechanism for converting the direction of force by rotation driving of the rotor into the direction along the optical axes of the lenses and transmitting the force in the direction thus converted to the lens holder; and a rotation stopper mechanism formed beside the small lens, for preventing the rotation of the lens holder; and an imaging mechanism for imaging object light having passed the lenses to acquire an image data representative of the object light.

According to the imaging device of the first embodiment, even where it is incorporated in the small-sized device, the plurality of lenses can be accurately driven, thus giving the auto-focusing function and the zooming function to the small-sized device.

In accordance with a second embodiment of this invention, there is provided a lens driving device for driving lenses in the direction along their optical axes, characterized by comprising: a stator composed of a coil of a flux of wires cylindrically wound to generate magnetic force lines, and a coil case covering the surface of the coil, for guiding the magnetic force lines generated by the coil into the coil case to create a magnetic field and receiving stress applied to the lens driving device; a rotor located in the stator and having a cylindrical shape which is coaxial with the rotor, the rotor being rotation-driven by the magnetic field created by the stator; a lens holder located further inside the rotor, for holding the lenses with their optical axes along a center axis of the rotor; and a converting mechanism for converting the direction of force due to rotation-driving of the rotor into the direction along the optical axes of the lenses and transmitting the force in the direction thus converted to the lens holder.

Conventionally, in order to drive the lenses accurately, the components such as the rotor, stator and lenses have been housed in a firm or strong enclosure so that these components are protected from the stress externally applied.

In accordance with the lens driving device of this embodiment, the rotor, lens holder and converting mechanism are housed within the coil cases which constitute a part of the structure encircling the lens driving device. Usually, the coil cases are made of metal to guide the magnetic force lines as a yoke and so have high strength. Thus, if the coil cases used as they are naked without housing this lens driving device within the enclosure, the components such as the rotor, lens holder and converting mechanism encircled by the coil cases are protected from the stress externally applied. Using the coil cases as they are naked, the strong and small-sized lens driving device can be realized.

Further, preferably, the lens driving device according to this embodiment is provided with an upper cover and a lower cover which sandwich the coil case from both ends, and the rotor, lens holder and converting mechanism are housed in the space encircled by the coil cases, upper cover and lower cover.

Provision of the upper cover and lower cover avoids the upsizing of the device and effectively prevents damage of the lenses.

Preferably, the lens driving device according to this embodiment is provided with a plurality of pillars which couple the upper and lower cover with each other and encircle the coil cases.

By coupling the upper cover and lower cover by the plurality of pillars and arranging the coil cases in a space encircled by these pillars, the coil cases can be accurately positioned.

In order to attain the above object, the imaging device according to the second embodiment of this invention is an imaging device for acquiring an image data representative of object light by driving lenses in a direction along their optical axes to image the object light through these lenses, comprising a stator composed of a coil of a flux of wires cylindrically wound to generate magnetic force lines, and a coil case covering the surface of the coil, for guiding the magnetic force lines by generated by the coil into the coil case to create a magnetic field and receiving stress applied to the imaging device; a rotor located in the stator and having a cylindrical shape which is coaxial with the rotor, the rotor being rotation-driven by the magnetic field created by the stator; a lens holder located further inside the rotor, for holding the lenses with their optical axes along the a center axis of the rotor; a converting mechanism for converting the direction of force due to rotation-driving of the rotor into the direction along the optical axes of the lenses and transmitting the force in the direction thus converted to the lens holder; and an imaging mechanism for imaging the object light having passed the lenses, thereby acquiring the image data representative of the object light.

In accordance with the imaging device of the second embodiment of this invention, even when great stress is applied to it, the lenses can be driven accurately. The imaging device according to the second embodiment of this invention, whose upsizing is restrained, can be incorporated in a small-sized device such as a cellular phone.

A lens driving device according to third embodiment of this invention is a lens driving device for driving lenses in a direction along their optical axes, comprising: a stator having a cylindrical shape, for generating a magnetic field therein; a rotor located within the stator and having another cylindrical shape which is coaxial with the stator, the rotor being rotation-driven for the stator by a magnetic field created by the stator; a lens holder located further inside the rotor, for holding the lenses with their optical axes along the optical shape; a converting mechanism for converting the direction of force by rotation driving of the rotor into the direction along the optical axes of the lenses and transmitting the force in the direction thus converted to the lens holder; and a cover for holding an imaging element for reading object light imaged after having passed the lenses to acquire an image data representative of the object light, and covering the stator on the side opposite to an incident side of the object light thereby forming a housing space for housing the rotor, lens holder and converting mechanism.

According to the lens driving device of this embodiment, inside the stator, the rotor and lens holder are arranged. Further, the imaging element is held by the cover which covers the stator on the side opposite to an incident side of the object light. For this reason, while cost and space necessary to provide the new component for securing the imaging element to the body enclosure and others are reduced, the relative positions of the lenses and the imaging element to each other can be fixed, thereby avoiding image shifting occurring on the picked up image.

Further, in the lens driving device according to this embodiment, the rotor, lens holder and converting mechanism are provided within a housing space constituted by the stator and cover. In addition, the imaging element is attached to the cover. Thus, an integral structure composed of the components necessary to take the image of the object is given. Accordingly, without providing the enclosure for housing the imaging element, the imaging device can be incorporated, as it is, in the small-sized device such as the cellular phone, thereby greatly downsizing the entire device.

In the lens driving device according to this embodiment, preferably, through physical contact of the above cover with the rotor, the movement of the rotor in the direction perpendicular to the axis of the rotor is prevented.

If the rotor moves in the direction perpendicular to its center axis, the lens holder arranged inside the rotor will also rattle. Thus, the position of the optical axes of the lenses will be shifted, and further the lenses cannot be driven accurately.

According to the lens driving device according to the preferred embodiment of this invention, without providing any specific mechanism, the position displacement of the rotating axis of the rotor can be restrained, thereby realizing the lens driving with high accuracy.

The imaging device according to the third embodiment of this invention is an imaging device for imaging object light by lenses by driving the lenses in a direction along their optical axes thereby to acquire an image data representative of the object light, characterized by comprising: a stator having a cylindrical shape, for generating a magnetic field therein; a rotor located within the stator and having another cylindrical shape which is coaxial with the cylindrical shape, the rotor being rotation-driven for the stator by a magnetic field created by the stator; a lens holder located further inside the rotor, for holding the lenses with their optical axes along the optical shape; a converting mechanism for converting the direction of force of rotation driving of the rotor into the direction along the optical axes of the lenses and transmitting the force in the direction thus converted to the lens holder; an imaging element for reading object light imaged after having passed the lenses to acquire an image data representative of the object light; and a cover for holding the imaging element and covering the stator on the side opposite to an incident side of the object light thereby forming a housing space for housing the rotor, lens holder and converting mechanism.

In accordance with the imaging device of the third embodiment of this invention, the entire device can be downsized, and the lenses can be driven in a direction along the optical axes of the lenses. Further, in accordance with the imaging device of this invention, the relative positions of the lenses and the imaging element to each other are fixed, thus acquiring the high-quality image.

Incidentally, as regards the imaging device referred to in this invention, only its basic configuration will be illustrated. This only intends to avoid repetition. The imaging device referred to in this invention includes not only the basic configuration, but also various configurations corresponding to the various configurations of the lens driving device proposed above.

In accordance with this invention, there are provided a small-sized lens driving device and imaging device capable of driving the lenses along their optical axes.

DETAILED DESCRIPTION OF THE INVENTION

Figure 1:
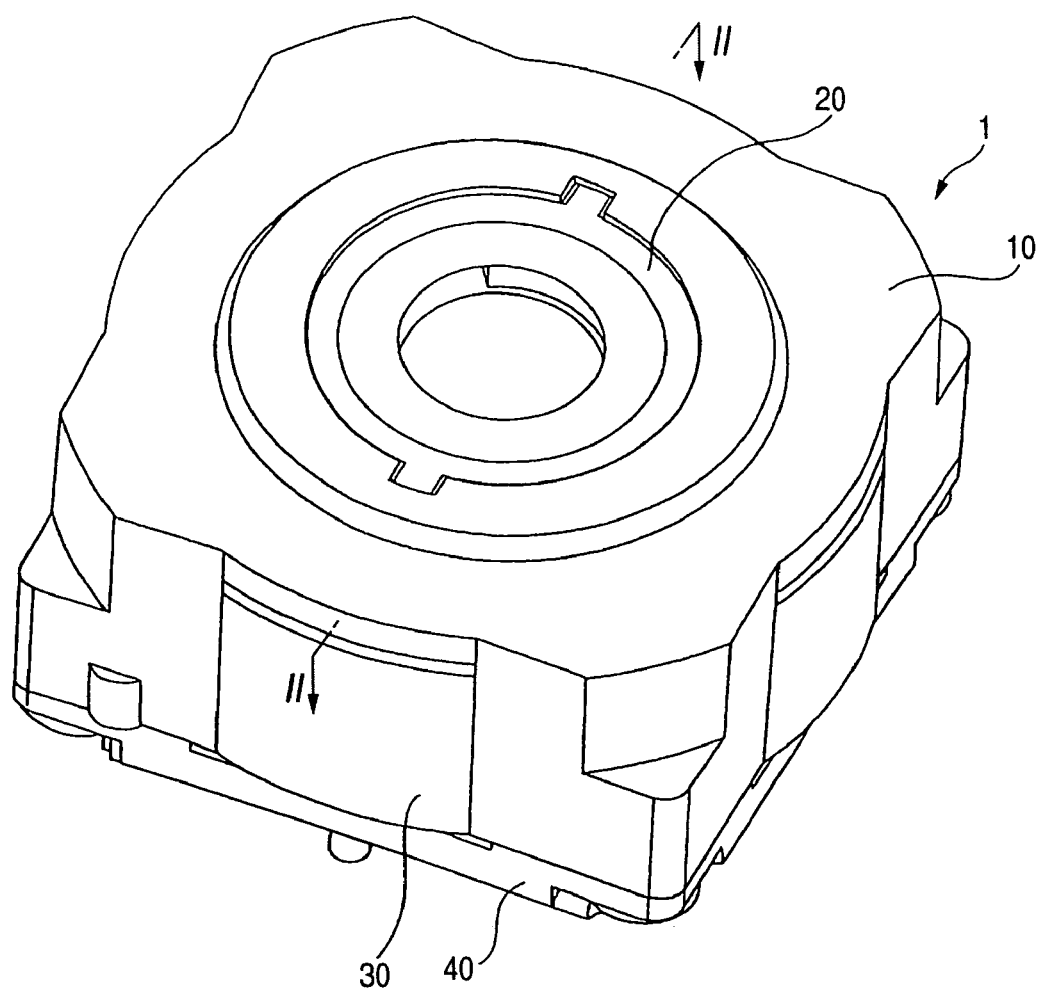
FIG. 1 is an appearance perspective view of the imaging device to which an embodiment of this invention is applied

Now referring to the drawings, an explanation will be given of various embodiments of this invention.

FIG. 1 is an appearance perspective view of the imaging device to which an embodiment of this invention is applied.

An imaging device 1 is a small-sized imaging device incorporated in e.g. a cellular phone, which has an auto-focusing function of focusing on an object by driving a plurality of lenses in direction along the optical axis (hereinafter referred to as a back-and-forth direction). In the imaging device 1, in its external appearance, a stator 30 having a cylindrical shape is sandwiched between an upper cover 10 and a lower cover 40. Inside the stator 30, a magnet and lenses described later are arranged. Apart of the front of lens holder 20 which holds the lenses is engaged with a part of the upper cover 10.

Figure 2:
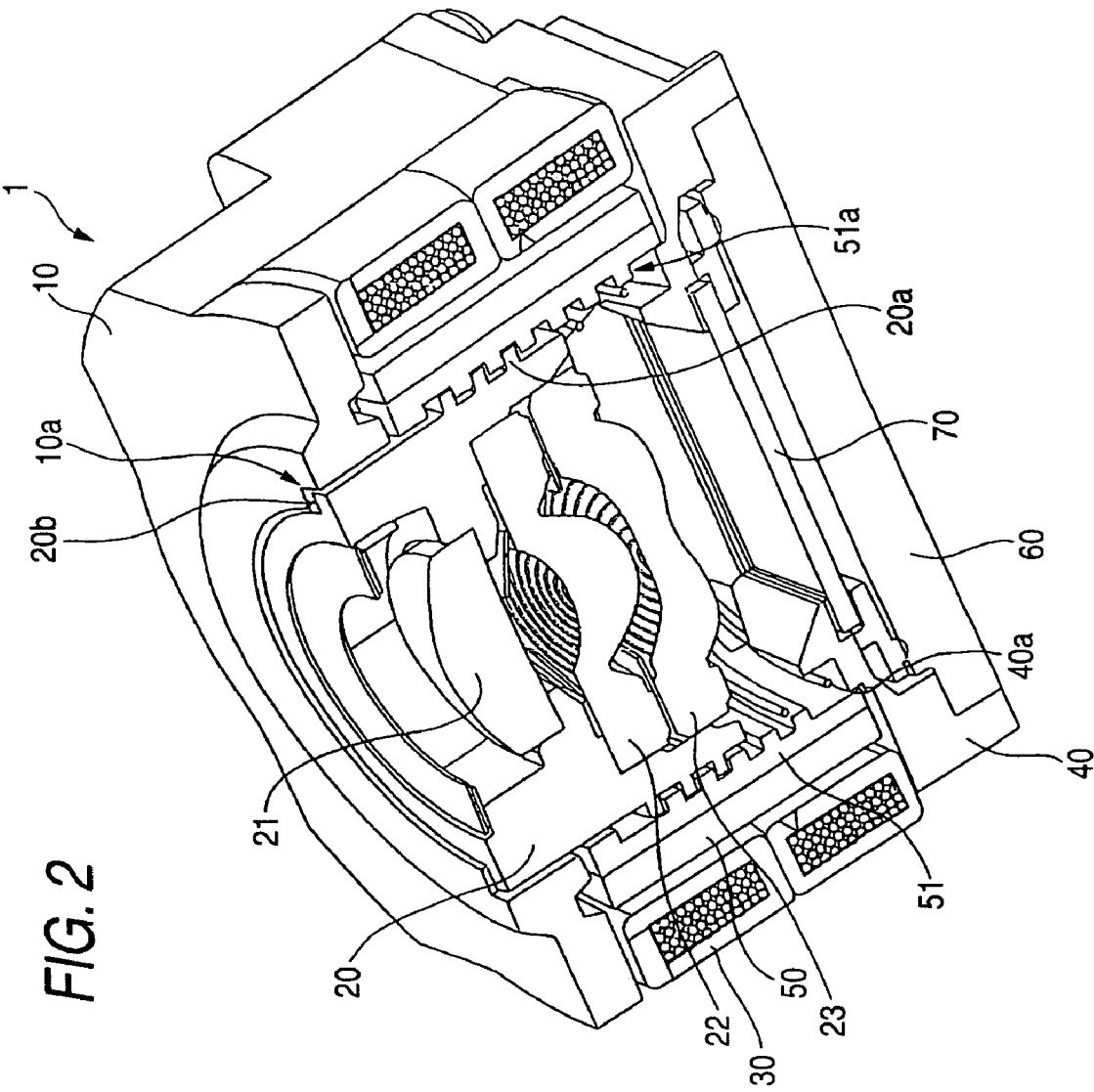
FIG. 2 is a sectional view taken in line II—II in the imaging device shown in FIG. 1.

FIG. 2 is a sectional view taken in line II—II in the imaging device shown in FIG. 1.

In FIG. 2 illustrated are the upper cover 10, lower cover 40, stator 30 and lens holder 20 also shown in FIG. 1. Also illustrated are a first lens 21, a second lens 22, a third lens 23, a magnet 50, a rotating body 51 and a CCD 60.

The lens holder 20, magnet 50 and rotating body 51 have a cylindrical shape coaxial with the stator 30, respectively. Inside the stator 30, in order from the side near the stator 30, the magnet 50, rotor 51 and lens holder 20 are arranged. The stator 30 and magnet 50 constitute a stepping motor. When a pulse current is passed through the stator 30, the magnet 50 is rotated by the number of revolutions corresponding to the pulse current. The stator 30 is an example of the stator referred to in this invention. The magnet 50 is an example of the rotor referred to in this invention. The lens holder 20 is an example of the lens holder referred to in this invention.

Figure 3:
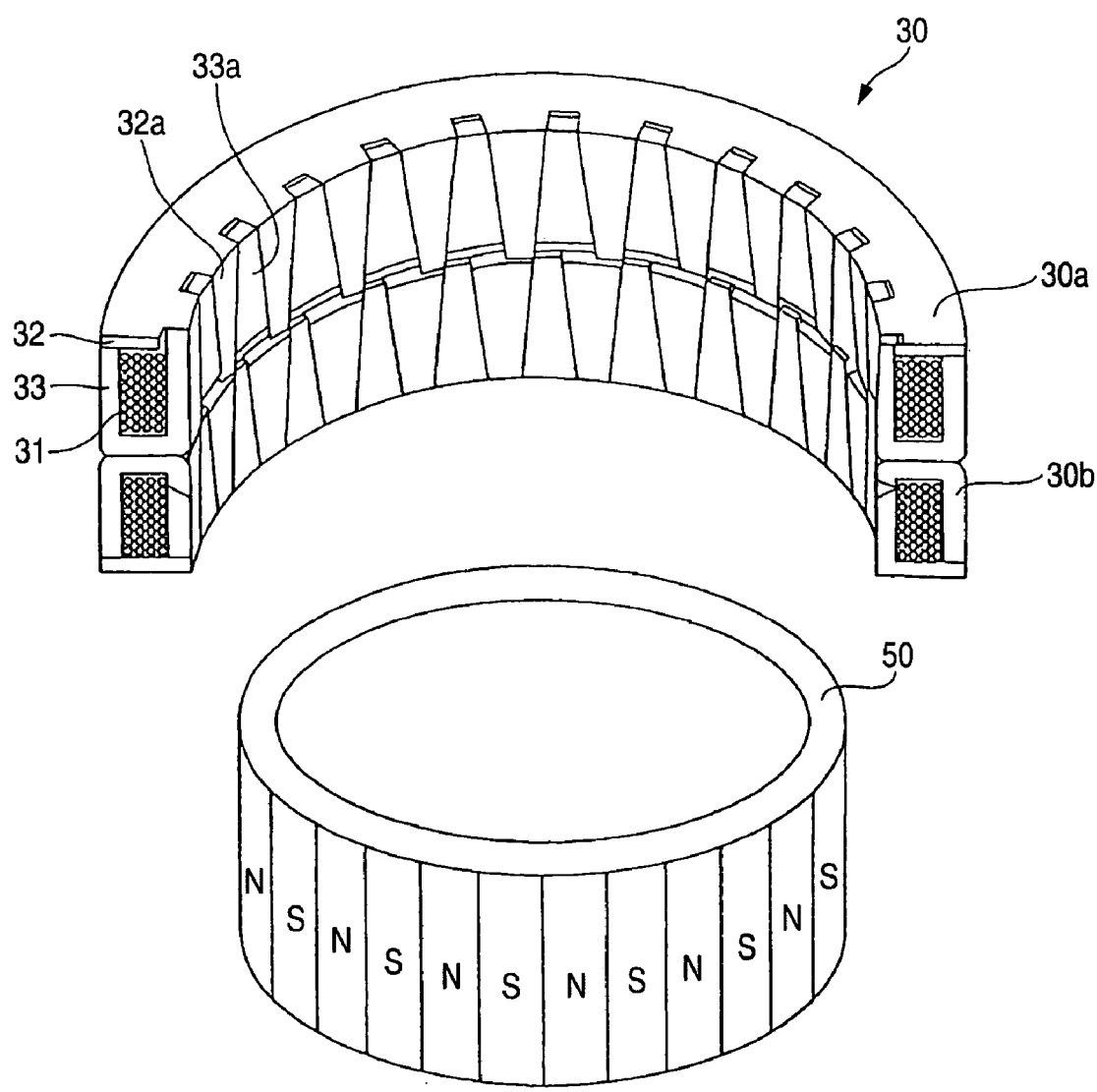
FIG. 3 is a view showing one embodiment of a stator 30 and a magnet 50.

Now, the explanation of FIG. 2 is interrupted once. Referring to FIG. 3, a detailed explanation will be given of the stator 30 and the magnet 50.

FIG. 3 is a view showing the stator 30 and the magnet 50.

The stator 30 is composed of two layer coil components of an upper coil component 30a and a lower coil component 30b. Since the upper coil component 30a and lower coil component 30b have the same configuration, without explaining the configuration of the lower coil component 30b, only the configuration of the upper coil component 30a will be explained below.

The upper coil component 30a is encircled in a cylindrical shape by an upper coil cover 32 and a lower coil cover 33. Inside the space formed by these covers, a coil 31 consisting of a wound wire is housed. On the inside of the cylindrical shape, the upper coil cover 32 and lower coil cover 33 are provided with teeth 32a, 33a arranged to be engaged alternately with each other. A gap is formed between the teeth 32a and 33a.

The coil 31 of the upper coil component 30a and the coil 31 of the lower coil component 30b are alternately supplied with a pulse current. The coil 31, when supplied with the pulse current, generates magnetic force lines which are guided to the inside of the cylindrical shape by the upper coil cover 32 and lower coil cover 33. When the magnetic force lines thus guided have reached the teeth 32a, 33a, they once go out into the air to get over the gaps. Thus, one of the teeth 32a, 33a arranged to be engaged with each other serves as an N-pole whereas the other thereof serves as a P-pole. As a result, magnetic fields with the N-pole and S-pole are alternately formed along the inner periphery of the cylindrical shape of the stator 30.

The magnet 50 is a permanent magnet with magnetized N-poles and S-poles alternately formed on the outer periphery of its cylindrical shape by, for example, passing the magnet through the interior of a ring-shaped head with the N-poles and S-poles alternately formed on the inner periphery. The magnet 50 is rotation-driven for the stator 30 by repulsion force and attraction force for the magnetic field formed by the stator 30.

The rotation-driving of the magnet 50 will be explained below.

The magnet 50 has 48 magnetized poles. Correspondingly, the upper coil component 30a and lower coil component 30b have 48 teeth, respectively. The location of the teeth of the upper coil component 30a is displaced by half a tooth from that of those of the lower coil component 30b. When the stator 30 is supplied with the pulse current as described later, with one pole corresponding to one step, the magnet 50 is rotated to make a round by 48 steps.

The magnet 50 can be surely rotated in a forward direction by repeating current supply in the order of the forward direction of the upper coil component 30a, forward direction of the lower coil component 30b, a backward direction of the upper coil component 30a and the backward direction of the lower coil component 30b. Further, the magnet 50 can be rotated in the backward direction by repeating the current supply in the order of the forward direction of the upper coil component 30a, backward direction of the lower coil component 30b, backward direction of the upper coil component 30a and forward direction of the lower coil component 30b.

The explanation of FIG. 3 has been now completed. Returning to FIG. 2 again, the explanation will proceed.

The rotating body 51 shown in FIG. 2 is bonded to the inside of the magnet 50 and is rotated with rotation of the magnet 50. On the inner surface of the rotating body 51, spiral grooves 51a are formed. The spiral grooves 51a are engaged with spiral grooves 20a (described later) formed on the outer surface of the lens holder 20.

The lens holder 20 holds the lenses arranged in the order of the first lens 21, second lens 22 and third lens 23 from the side near the upper cover 1. In this embodiment, of the three lenses, the first lens 21 having the smallest diameter is located at the end near the upper cover 1. These first lens 21, second lens 22 and third lens 23 satisfy the following requirement.

First, in this embodiment, the first lens 21 is made of a glass material. The first lens is formed in a meniscus shape having positive power with a convex front face (near the upper cover) (hereinafter referred to as front surface).

In this embodiment, the second lens 22 is made of a plastic material. The second lens 22 is formed in the meniscus shape having negative power with a non-spherical rear surface and a concave front surface.

The third lens 23 is made of the plastic material. The third lens is formed in the shape having negative power with both non-spherical front and rear surfaces, the rear surface being convex in the vicinity of the optical axis.

Assuming that the near axis focal distance of the entire lens system is f, the near axis focal distance of the third lens 23 is f3, the curvature radius of the surface of the first lens 21 is R1 and the half view angle of the greatest image height is θ, these lenses satisfy the following equations.

$$0.6 < R1/f < 0.8 \quad (1)$$

$$-1.0 < f3/f < 0 \quad (2)$$

$$0.60 < \tan\theta < 0.70 \quad (3)$$

By adopting the first lens 21, second lens 22 and third lens 23 satisfying the above requirements, a compact and high accuracy group of lenses can be constituted.

Further, the first lens 21 has a diameter smaller than that of the second lens 22 and third lens 23. So, a larger space 2 is formed beside the first lens 21 than beside the second lens 22 and the third lens 23. The first lens 21 is an example of the small lens referred to in this invention. The lens holder 20 has the spiral grooves 20a on its outer surface where the second lens 22 and third lens 23 are held. The outer wall of the portion of the lens holder 20 where the first lens 21 is held is kept in contact with the upper cover 10.

An explanation will be given of a mechanism for driving the lens holder 20 in the back-and-forth direction.

When the stator 30 is supplied with a pulse current, with the rotation of the magnet 50, the rotating body 51 is rotated to make a round at every 48 steps. The number of the spiral grooves 51a of the rotating body. 51 is greater by two rounds (=96 steps) than that of the spiral grooves 20a of the lens holder 20. Therefore the lens holder 20 can move by a distance corresponding to 96 steps.

The rotating force of the rotating body 51 is converted into the force in the back-and-forth direction by means of the spiral grooves 51a and the spiral grooves 20a. The force converted in the back-and-forth direction is transmitted to the lens holder 20 so that the lens holder 20 is driven in the back-and-forth direction. In this embodiment, at a full stroke (=96 steps), the lens holder 20 is moved by about 1.25 mm in the back-and-forth direction. At one step, the lens holder 20 is moved by about 13 μm in the back-and-forth direction. Thus, in the imaging device 1, the lens position can be controlled in units of 13 μm. The combination of the spiral grooves 51a and the spiral grooves 20a is an example of the converting mechanism referred to in this invention.

The upper cover 10 shown in FIG. 2 is secured to the stator 30 and is kept in contact with the outer wall of the portion of the lens holder 20 where the first lens 21 is held.

The lower cover 40 is also secured to the stator 30. The lower cover 40 holds a low pass filter 41 and a CCD 60.

The object light having passed the first lens 21, second lens 22 and third lens 23 is incident on the CCD 60 through the low pass filter 41. The low pass filter 41 removes an excessively dense spatial frequency component contained in the object light. Provision of the low pass filter 41 reduces inconveniences such as color moiré and pattern moiré.

The object light having passed the low pass filter 4.1 is incident on the CCD 60 where the image data representative of the object is created. The CCD 60 is an example of the imaging mechanism referred to in this invention.

In the imaging device 1 described above, the auto-focusing function is realized in the following procedure. It is now assumed that when the stator 30 is supplied with the pulse current in the forward direction, the lens holder 20 is moved in the forward direction.

First, the object light is read coarsely by the CCD 60. Thus, the low resolution data representative of the object light are created. The low resolution data is transmitted to the CPU in the cellular phone equipped with the imaging device 1.

Next, the stator 30 is supplied with the pulse current in the forward direction to move the lens holder 20 by the distance corresponding to one step.

When the stator 30 is supplied with the pulse current, the magnet 50 is rotated by one step. And with the rotation of the magnet 50, the rotating body 51 is rotated. The rotating force of the rotating body 51 is converted into the force in the forward direction which is in turn transmitted to the lens holder 20. Thus the lens holder 20 is moved by about 13 μm in the forward direction.

When the lens holder 20 has been moved, the object light is read again by the CCD 60 to create the low resolution data. The low resolution data thus created is also transmitted to the CPU of the cellular phone equipped with the imaging device 1.

The CPU detects the respective contrasts of the two low resolution data transmitted from the CCD 60 to determine which of the detected contrasts is larger. If the contrast of the preceding low resolution data is larger, the stator 30 is supplied with the pulse current in the reverse direction to return the lens holder 20 by the distance corresponding to one step. If the contrast of the subsequent low resolution data is larger, the stator 30 is supplied with the pulse current in the forward direction to further move the lens holder by the distance corresponding to one step.

As described above, the processing of moving the lens holder 20 to detect the contrast is continued by 96 steps at the most until the magnitude is inverted between the contrast of the preceding low resolution data and that of the subsequent low resolution data. When the magnitude is inverted between these contrasts, the stator is supplied with the current in the direction opposite to the immediately previous direction, thus returning the lens holder 20 by the distance corresponding to one step. The position of the lens holder 20 at this time is an in-focus position where the contrast is the highest.

The imaging device 1 is basically structured as describe hitherto.

Meanwhile, the rotating force of the magnet 40 is transmitted to the lens holder 20 through the spiral grooves 51 and spiral grooves 20. In this case, if the movement of the lens holder 20 in the rotating direction is not limited, the lens holder 20 is moved in the back-and-forth direction while being rotated. Owing to this, the image may get out of position due to eccentricity. In order to prevent such a rotation of the lens holder 20, the lens holder 20 and upper cover 10 are provided with a rotation stopper mechanism. The rotation stopper mechanism will be explained below.

Figure 4:
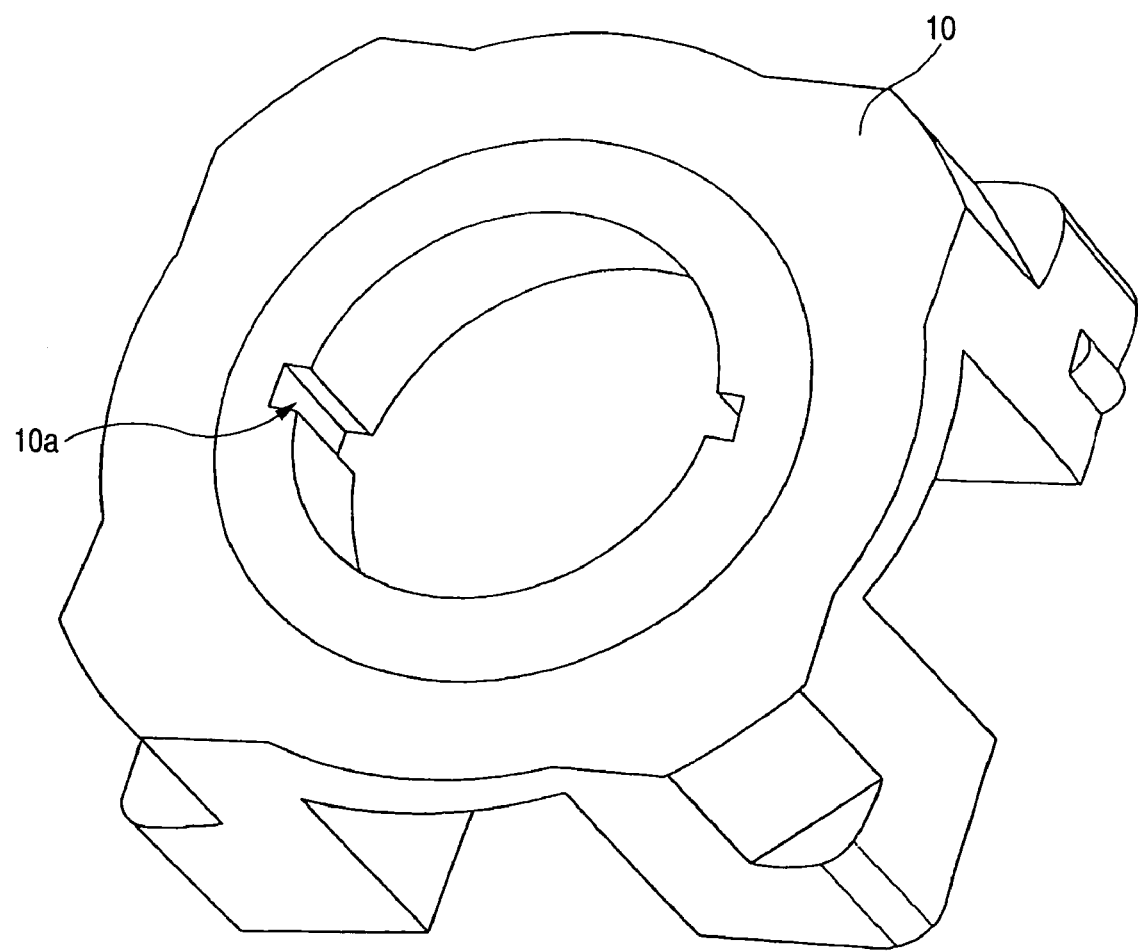
FIG. 4 is an external appearance view of one embodiment of an upper cover 10.
Figure 5:
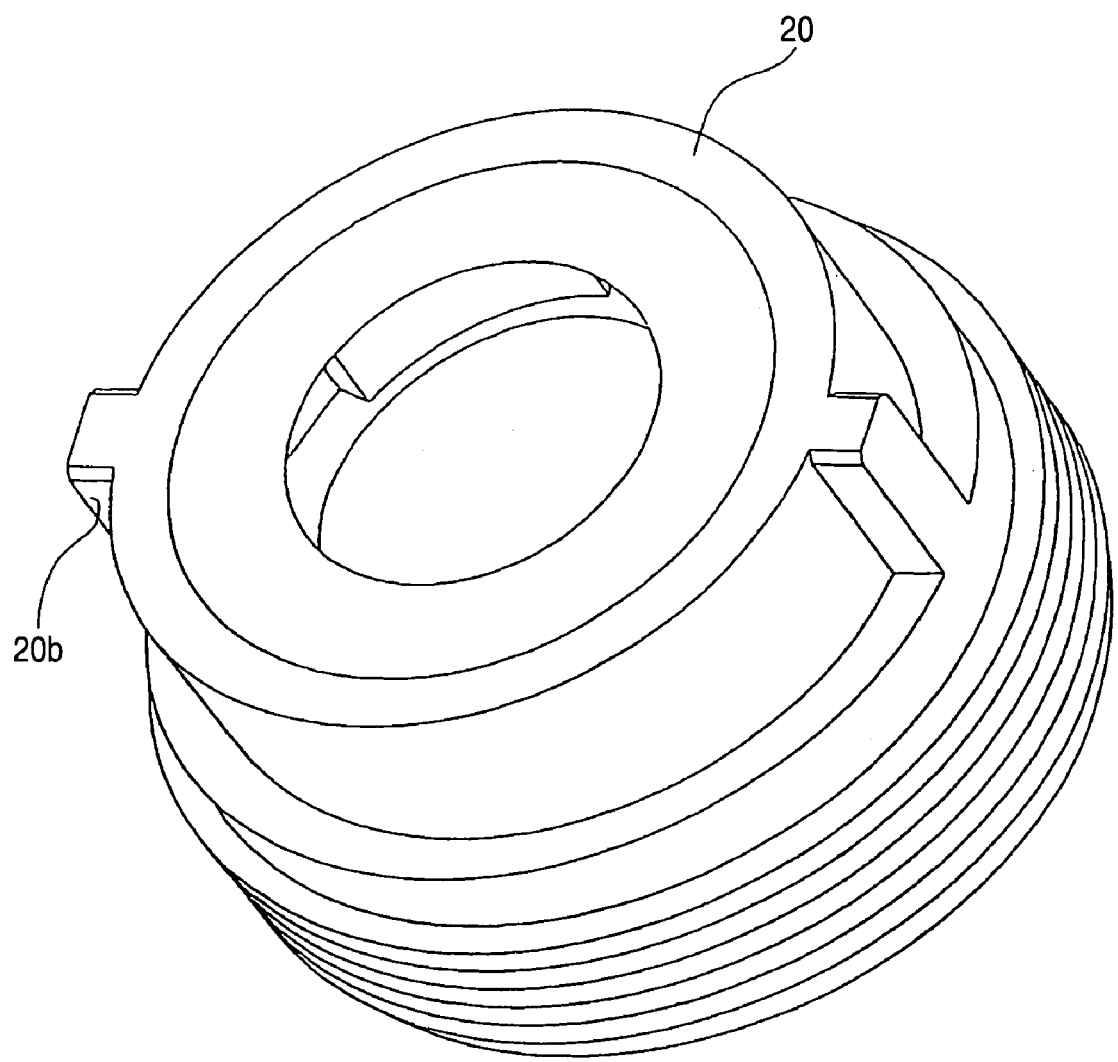
FIG. 5 is an external appearance view of one embodiment of a lens holder 20.

FIG. 4 is an external appearance view of the upper cover 10. FIG. 5 is an external appearance view of the lens holder 20.

On the inner wall of the upper cover 10 shown in FIG. 4A, a rail 10a is formed. Further, on the outer wall of the lens holder 20 shown in FIG. 5, a guide 20b to be fit in the rail 10a is formed. Fitting of the guide 20b of the lens holder 20 and the rail 10a of the upper cover 10 to each other prevents the rotation of the lens holder 20. The combination of the guide 20b and the rail 10a is an example of the rotation stopping mechanism referred to in this invention.

These rail 10a and guide 20b are provided in the space 2 beside the first lens 21 shown in FIG. 2. This space 2 is created because the diameter of the first lens 21 is smaller than that of the second lens 22 and the third lens 23. Using this space, the rotation stopper mechanism can be provided in the small-sized imaging device 1 incorporated in e.g. the cellular phone, thereby surely preventing the lens holder 20 from being rotated.

Figure 6:
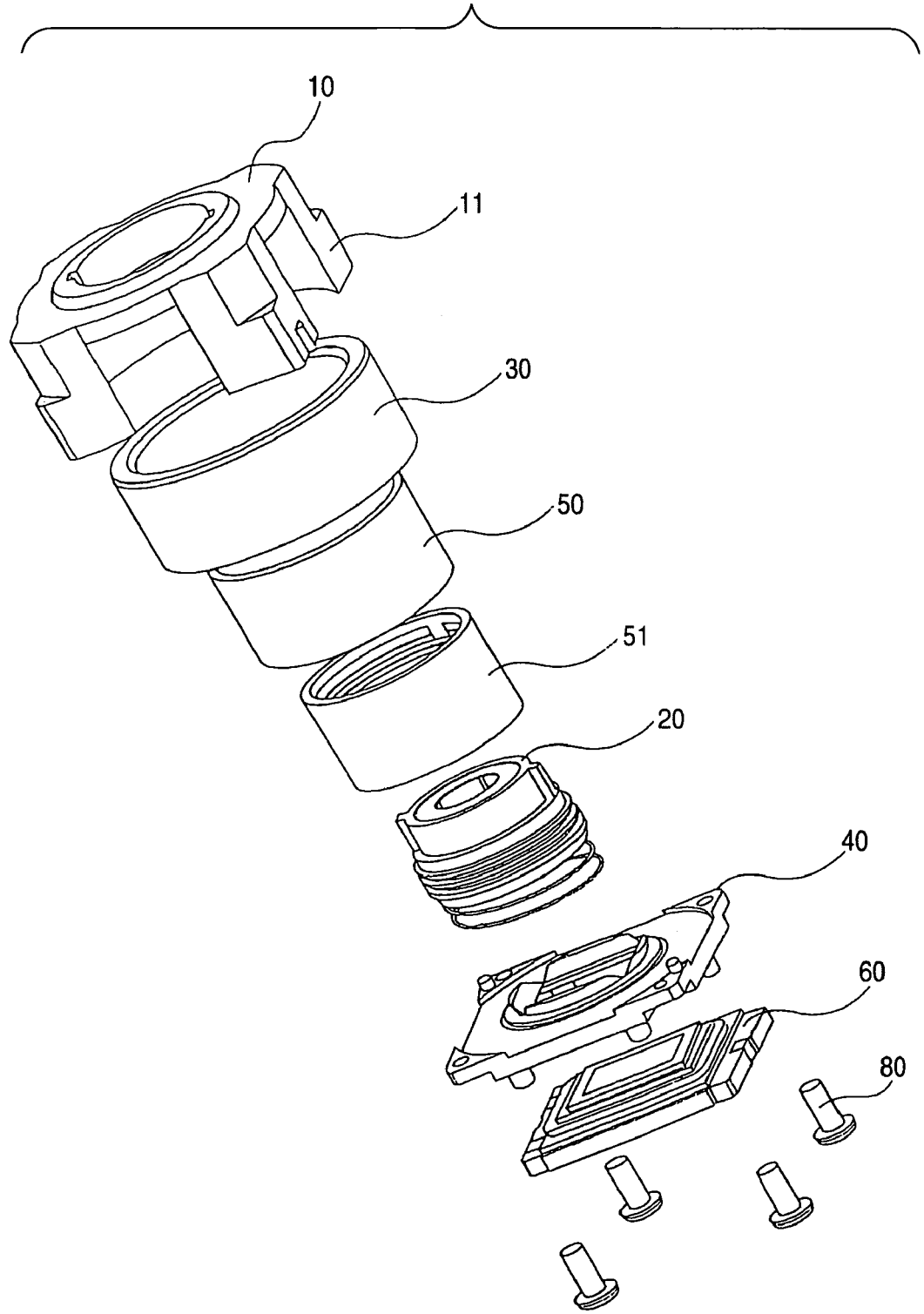
FIG. 6 is an exploded perspective view of the imaging device 1

FIG. 6 is an exploded perspective view of the imaging device 1.

In the imaging device 1, a plurality of pillars 11 formed on the upper cover 10 are coupled with the lower cover 40 by screws 80. The stator 30 is arranged in the space formed by the upper cover 10, pillars 11 and lower cover 40.

The pillars 11 formed on the upper cover 10 are prepared in order to determine the position of the stator 30. The screws 80 may be removed after the pillars 11 and lower cover 40 have been bonded to each other using e.g. adhesive. However, since the size of the imaging device remains unchanged even when the screws 80 have been removed, in this embodiment, also when the imaging device 1 is assembled, the screws 80 are left as they are mounted.

Within the cylindrical shape of the stator 30, the magnet 50, rotating body 51 and lens holder 20 are arranged in this order from the side near the stator 30. The coil cases 31, 32 constituting the stator 30 are made of metal to guide magnetic force lines into the cylindrical shape. Since the magnet 50, rotating body 51 and lens holder 20 are encircled by these coil cases 31, 32, they are protected from the stress applied to the imaging device 1.

The lower cover 40 serves to cover the cylindrical mouth of the stator 30 and also hold the CCD 60. For this reason, in the imaging device 1 according to this embodiment, the component for holding the CCD can be omitted, thus reducing the cost of the components and housing space.

Since the imaging device 1 is encircled by the upper cover 10, lower cover 40 and stator 30, fragile components such as the lenses are protectively housed in the space thus formed. Further, the CCD 60 is held by the lower cover 40. Thus, a single structure with high strength having an imaging function is formed by the imaging device 1 alone. Accordingly, without providing the enclosure for housing the imaging device, the imaging device 1 can be incorporated, as it is, in the small-sized device such as the cellular phone, thereby greatly downsizing the entire device.

As means for driving the lens holder, the above embodiment has been directed to the application of the stepping motor controlling the rotation of the rotor by supplying the pulse current to the stator. However, the motor for driving the lens holder referred to in this invention may be a DC motor and others.

As the converting mechanism, the above embodiment has been directed to the application of the spiral grooves. However, the converting mechanism referred to in this invention may be e.g. cam grooves and cam pins.

Further, in the above embodiment, realizing the auto-focusing function by driving the lens holder has been explained. However, the lens driving device and imaging device according to this invention may be also used to realize e.g. the zooming function, or to realize both zooming function and auto-focusing function.

Further, in the above embodiment, the guide was given to the lens holder whereas the rail was given to the upper cover. However, the rotation stopper mechanism referred to in this invention may be realized e.g. by giving the rail to the lens holder while giving the guide to the upper cover.

What is claimed is:

1. A lens driving device comprising:
   a stator having a cylindrical shape, that generates a magnetic field therein;
   a rotor located within said stator and having a cylindrical shape which is coaxial with said stator, said rotor being rotation-driven by the magnetic field created by said stator;
   a lens holder located inside said rotor, that holds a plurality of lenses so that optical axes of the lenses are arranged along a center axis of said rotor, wherein a small lens of said plurality of lenses having a relatively smaller diameter than that of other of said plurality of lenses is located at an end of the arrangement of said plurality of lenses;
   a converting mechanism that converts a direction of force of rotation-driving of said rotor into a direction along the optical axes of the lenses and transmits the force to said lens holder; and
   a rotation stopper mechanism formed beside said small lens, that prevents a rotation of said lens holder.

2. The lens driving device according to claim 1, wherein said converting mechanism comprises spiral grooves formed on an inner wall of said rotor, and other spiral grooves formed on an outer wall of said lens holder to be engaged with said spiral grooves of said rotor.

3. The lens driving device according to claim 1, wherein said rotation stopper mechanism comprises a guide and a rail which extend in parallel to the optical axes of the lenses, said guide and said rail formed to fit to each other, one of said guide and rail being secured to said lens holder whereas the other thereof being secured to said stator.

4. An imaging device comprising:
   a stator having a cylindrical shape, that generates a magnetic field therein;
   a rotor located within said stator and having a cylindrical shape which is coaxial with said stator, said rotor being rotation-driven by the magnetic field created by said stator;
   a lens holder located inside said rotor, that holds a plurality of lenses so that optical axes of the lenses are arranged along a center axis of said rotor, wherein a small lens of the plurality of lenses having a relatively smaller diameter than that of other of said plurality of lenses is located at an end of the arrangement of said plurality of lenses;
   a converting mechanism that converts a direction of force of rotation-driving of said rotor into a direction along the optical axes of the lenses and transmits the force to said lens holder;
   a rotation stopper mechanism formed beside said small lens, that prevents a rotation of said lens holder; and
   an imaging mechanism that images object light having passed said lenses to acquire an image data representative of the object light.

5. A lens driving device for driving lenses in a direction along optical axes of the lenses, comprising:
   a stator comprising:
   a coil of a flux of wires cylindrically wound to generate magnetic force lines; and
   a coil case covering a surface of said coil, that guides the magnetic force lines generated by said coil into the coil case to create a magnetic field and receives stress applied to the lens driving device;
   a rotor located in said stator and having a cylindrical shape coaxial with said stator, said rotor being rotation-driven by the magnetic field created by said stator;
   a lens holder located inside said rotor, that holds the lenses so that optical axes of the lenses are arranged along a center axis of said rotor; and
   a converting mechanism that converts a direction of force of rotation-driving of said rotor into a direction along the optical axes of the lenses and transmits the force to the lens holder.

6. The lens driving device according to claim 5, wherein the lens driving device comprises an upper cover and a lower cover which sandwich said coil case from both ends of said coil case, and
   said rotor, said lens holder and said converting mechanism are housed in a space encircled by said coil case, said upper cover and said lower cover.

7. The lens driving device according to claim 6, wherein the lens driving device comprises a plurality of pillars which couples said upper cover to said lower cover and encircles said coil case.

8. An imaging device for acquiring an image data representative of object light by driving lenses in a direction along optical axes of the lenses to image the object light through the lenses, comprising
   a stator comprising:
   a coil of a flux of wires cylindrically wound to generate magnetic force lines; and
   a coil case covering a surface of said coil, that guides the magnetic force lines generated by said coil into the coil case to create a magnetic field and receives stress applied to the lens driving device;
   a rotor located in said stator and having a cylindrical shape coaxial with said stator, said rotor being rotation-driven by the magnetic field created by said stator;
   a lens holder located inside said rotor, that holds the lenses so that optical axes of the lenses are arranged along a center axis of said rotor;
   a converting mechanism that converts a direction of force of rotation-driving of said rotor into a direction along the optical axes of the lenses and transmits the force to said lens holder; and an imaging mechanism that images the object light having passed the lenses to acquire the image data representative of the object light.

9. A lens driving device for driving lenses in a direction along optical axes of the lenses, comprising:
- a stator having a cylindrical shape, that generates a magnetic field therein;
- a rotor located within said stator and having a cylindrical shape which is coaxial with said stator, said rotor being rotation-driven by the magnetic field created by said stator;
- a lens holder located inside said rotor, that holds the lenses so that the optical axes of the lenses are arranged along a center axis of said rotor;
- a converting mechanism that converts a direction of force of rotation-driving of said rotor into a direction along the optical axes of the lenses and transmits the force to said lens holder; and
- a cover that holds an imaging element for reading object light imaged after having passed the lenses to acquire an image data representative of the object light, and said cover covering said stator on a side opposite to an incident side of the object light thereby forming a housing space for housing said rotor, said lens holder and said converting mechanism,
- wherein said cover prevents movement of said rotor in a direction perpendicular to the center axis of said rotor due to physical contact of said cover with said rotor.

10. An imaging device for imaging object light by lenses by driving the lenses in a direction along optical axes of the lenses to acquire an image data representative of the object light, comprising:
- a stator having a cylindrical shape, that generates a magnetic field therein;
- a rotor located within said stator and having a cylindrical shape which is coaxial with said stator, said rotor being rotation-driven by the magnetic field created by said stator;
- a lens holder located inside said rotor, that holds the lenses along their optical axes;
- a converting mechanism for converting a direction of force of rotation-driving of said rotor into a direction along the optical axes of the lenses and transmits the force to said lens holder;
- an imaging element that reads object light imaged after having passed the lenses to acquire an image data representative of the object light; and
- a cover that holds the imaging element and covers said stator on a side opposite to an incident side of the object light thereby forming a housing space for housing said rotor, said lens holder and said converting mechanism,
- wherein said cover prevents movement of said rotor in a direction perpendicular to the center axis of said rotor due to physical contact of said cover with said rotor.

* * * * *